Nov. 12, 1968    P. EISLER    3,410,336
THERMAL CONDITIONING SYSTEM FOR AN ENCLOSED SPACE
Filed May 26, 1965    5 Sheets-Sheet 1
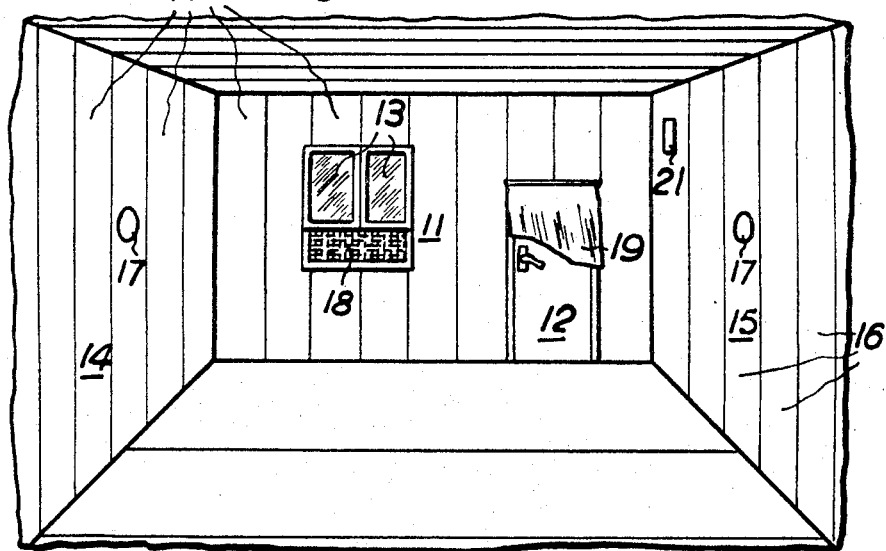
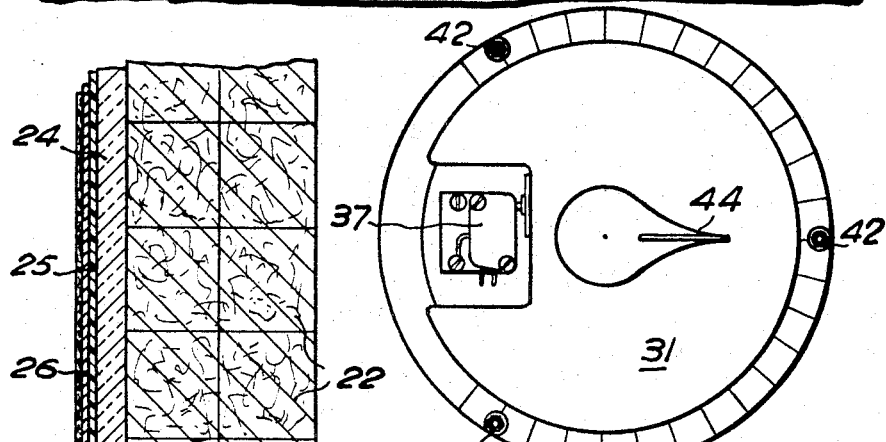
Inventor
Paul Eisler Nov. 12, 1968 P. EISLER 3,410,336
THERMAL CONDITIONING SYSTEM FOR AN ENCLOSED SPACE
Filed May 26, 1965 5 Sheets-Sheet 2

Inventor
Paul Eisler
By
Watson, Cole, Grindle & Watson
Attys.

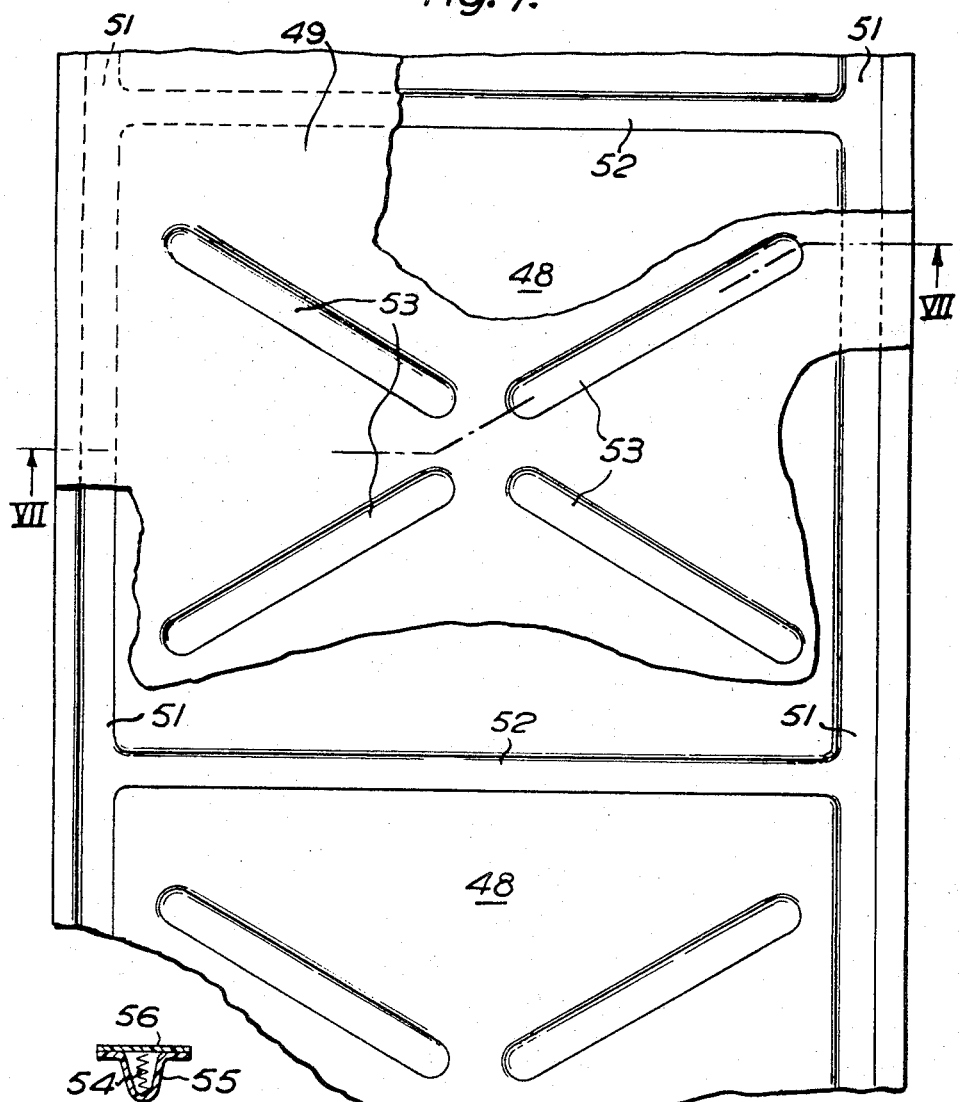

3,410,336
THERMAL CONDITIONING SYSTEM FOR AN ENCLOSED SPACE
Paul Eisler, 57 Exeter Road, London, N.W. 2, England
Filed May 26, 1965, Ser. No. 458,925
Claims priority, application Great Britain, May 26, 1964, 21,688/64
27 Claims. (Cl. 165—21)

ABSTRACT OF THE DISCLOSURE

A space is maintained between 55 and 95 degrees Fahrenheit, and thereby below blood temperature. The boundary walls of the space are regulated as to temperature by a sensing device and a second sensing device controls the temperature and humidity of the air in the space. In this manner, the radiant heat loss from an occupant of the space to the walls amounts to about 400 B.t.u. per hour minus the heat exchange between the occupant and the air within the space.

---

Figure 5:
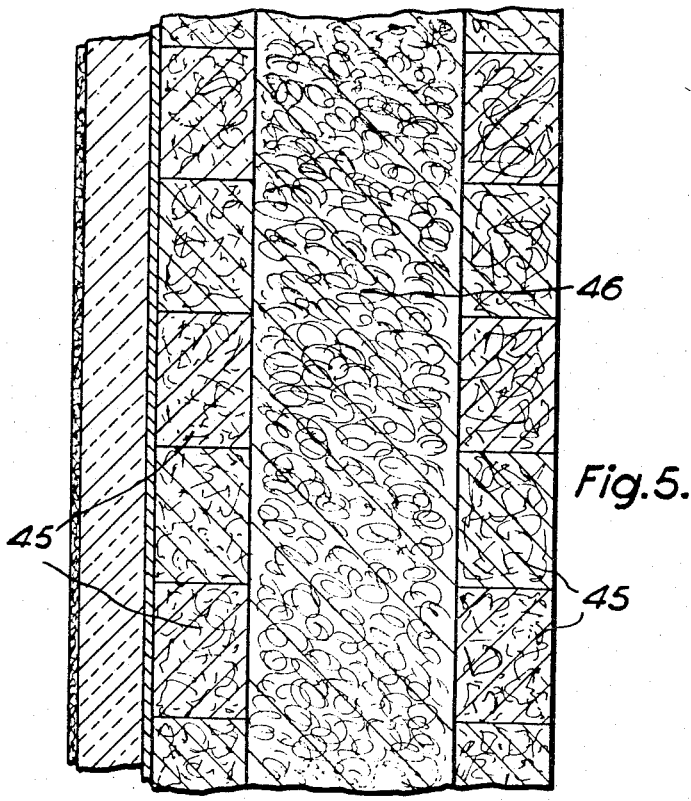

The present invention relates to the thermal conditioning of an enclosed space while it is occupied and its purpose is to afford high comfort at low running cost to any occupant, irrespective of the outdoor conditions, by controlling the heat loss of the occupant. Comfort requires that any average adult human occupant should lose about 400 B.t.u. per hour. The present invention provides for this to be mostly by radiation, heat exchange with the air being kept at a low value. Since radiative loss of a body depends on the temperature of that body and the temperature of the surface irradiated by that body and since radiative loss by the occupant is in all directions, as large a proportion of the surface of the walls as conveniently possible must be at a temperature below blood temperature, i.e. below 97 to 98° F. (36 to 37° C.), while both to minimise heat exchange with the air and the transmission of heat between the air and the walls (the greater the latter the greater the running costs) it is necessary to minimise the movement of air and to keep the passage of air into and out of the enclosed space as nearly as possible to the minimum required for ventilation and the like purposes. This calls for uniformity of temperature of the exposed wall surfaces especially in the vertical direction to avoid convection currents.

The above ends cannot be completely achieved in practice, but the aim of the invention is to approximate them within the bounds of practical achievement, and it thus differs in principle from convective systems and from air conditioning systems, both of which involve deliberately created movement of the air and when used for warming usually also involve radiators or other heating elements which are spatially so distributed that they cause air movement and/or are run at a temperature well above blood temperature, so that they radiate heat towards the occupants of the enclosed space.

According to the present invention a system of thermally conditioning an enclosed space while occupied by controlling the heat loss of any occupant of the space, comprises means for directly controlling the temperature of such a large part of the surface of the walls which is exposed to and bounds the space and maintaining such part of the surface at an average temperature below blood temperature so homogeneously both in spatial and time distribution that the radiation heat loss by any average adult human occupant of the space to the boundary walls amounts to the alegbraic sum of about 400 B.t.u. per hour and the heat exchanged directly between the occupant and the air within the space, the system providing for keeping the movement of air within the space at such a low value that the direct heat exchange between any such occupant and the air is a small fraction of 400 B.t.u. per hour. If, as may be the case under certain weather conditions (for example where the outdoor conditions are humid and so warm that the system requires the exposed surface of the walls to be cooled), the ambient atmosphere is at such a temperature and moisture content that that quantity of air which is of necessity admitted for ventilation or the like would raise the humidity of the air inside the space to a value leading to condensation on the exposed surface of the walls of the space, the system provides for the air to be desiccated before entry to a humidity low enough to avoid raising the humidity of the air inside the space to 100 percent relative humidity at the wall temperature level.

Where the system only needs to provide for warming the wall surfaces, e.g. in a cold climate, or for cooling in a hot but very dry atmosphere (desert conditions), provision for desiccation will usually be unnecessary, but where the system needs to provide only for cooling, e.g. in a hot, humid climate, or both for cooling and warming, e.g. in a temperate climate, such provision will be necessary. Where the weather conditions are such that the walls need to be cooled, the air is likely to be at such a temperature that direct heat exchange between the air and an occupant will be in the direction of imparting heat to the occupant, hence the occupant must radiate to the walls about 400 B.t.u. per hour, plus the heat he receives from the air, but when the weather conditions are such that the walls need to be warmed, the air is likely to be at such a temperature that the direct heat exchange is in the direction of heat being taken from the occupant by the air and he must therefore radiate about 400 B.t.u. per hour, minus the heat he loses to the air. The term "algebraic sum" used above and in the claim covers the possibility that sometimes the heat exchanged must be added to the 400 B.t.u. and sometimes subtracted, in other words added with a minus sign.

Control of the surface temperature over a large part of the total surface and its homogeneous distribution spatially, especially in the vertical direction, contributes directly to the avoidance of convective movement of the air and hence to keeping the total movement at a minimum. The homogeneous distribution in time, i.e. the avoidance of sudden or rapid changes, contributes to the same end. Air is a bad conductor of heat and in the absence of movement the exchange of heat between the air and the wall surfaces is minimised. Minimal air movement also reduces the exchange of heat with the occupants and thus ensures that it is a small fraction of 400 B.t.u. per hour. The major part of the heat lost by an occupant is by radiation and this depends on the wall surface temperature and is basically independent of the air temperature. Thus the combined two features of control of the wall surface temperature and minimisation of air movement constitute essential features of the present system. Heat exchange between the occupant and the air is a minor factor in the present system, in direct contrast to the usual convective heating systems and air conditioning systems.

As a general rule thermal insulation of the structural walls is necessary, especially of those the outer surfaces of which are exposed to the ambient outdoor atmosphere. Various arrangements of the insulation may be necessary according to conditions, as will be explained later. Also a good heat reflecting layer (light coloured paper or metal foil) may be necessary to minimise transfer of heat by radiative exchange with such walls as are exposed on the outside surface to the outdoor atmosphere.

Ideally the whole of the enclosed space should have the temperature controlled and held at the same value everywhere. In practice this is impossible since in general doors, windows and ventilating openings must be provided. Ventilation openings should be kept to a minimum, the windows and doors should be kept closed and the doors should be curtained or covered by a heat reflecting layer. These parts of the structure are important channels for the entry or loss of heat energy into or from the enclosed space and the extent to which this heat flow can be minimised, together with the extent to which the air in the space can be kept still, are the main factors influencing the running costs of the system.

It will be clear from what has been stated above that the system according to the invention is applicable whether the outside temperature is low or high, cold or hot. In the former case it is akin to a space heating and in the latter to a space cooling system. In either case the necessary heat exchange energy for maintaining the wall temperature can be exchanged with a flowing medium at an appropriate temperature, e.g. a gas, vapour or a liquid such as water, or if warming only is necessary, it may be obtained from the ohmic resistance loss. While Peltier and related thermo-electric effects of an electric current flowing through a layer on or in the boundary wall would produce cooling, the use of gas or of semiconductor thermo-elements is not proposed in the system according to the present invention, for practical reasons (cost, present state of development of thermo-electric cooling elements). Accordingly, where the system has to provide for both cooling and warming, a flowing medium is used for cooling, while warming may be effected by the medium or by an electric resistance heating element of appropriate large area and thin insulation, in other words an electric resistance heating film, such as described in my United States patent specification Nos. 2,971,073, 2,020,-378, 3,026,234 and 3,149,406 or my patent applications Ser. No. 165,736 filed Jan. 12, 1962, now Patent No. 3,283,284, and Ser. No. 510,278 filed Nov. 29, 1965.

Figure 13:
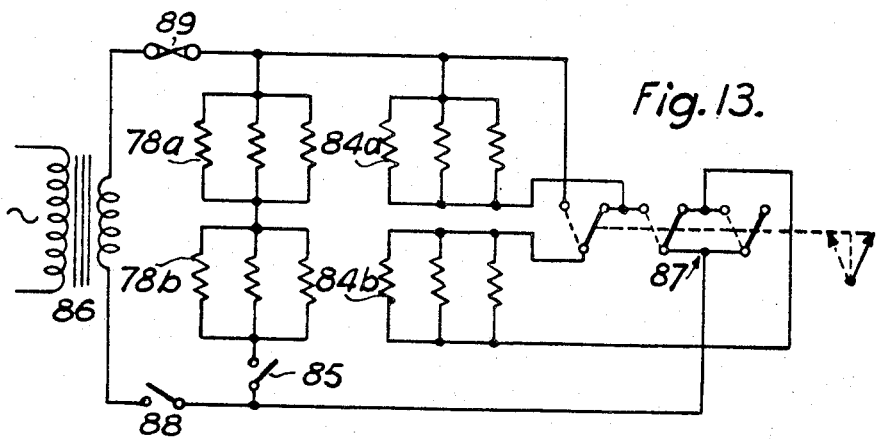
Figure 10:
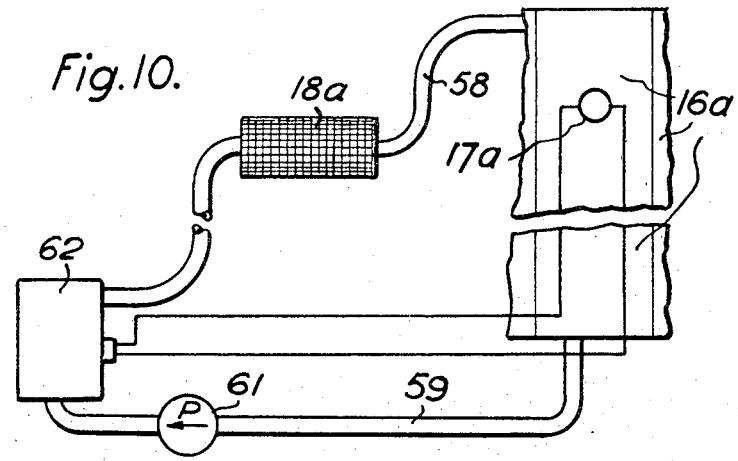
Figure 11:
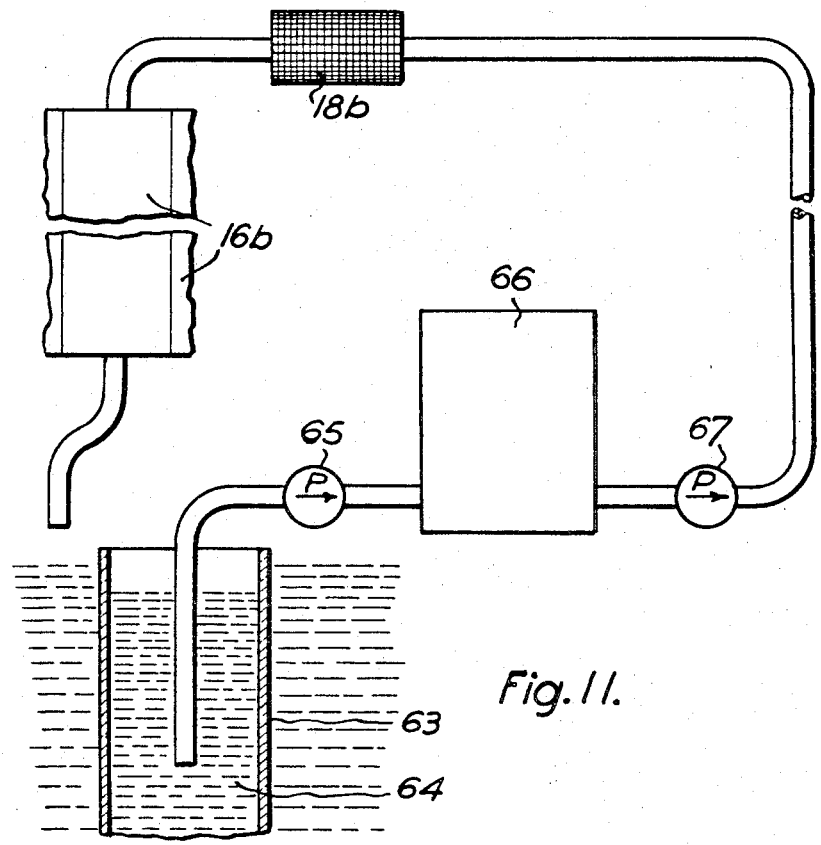
Figure 12:
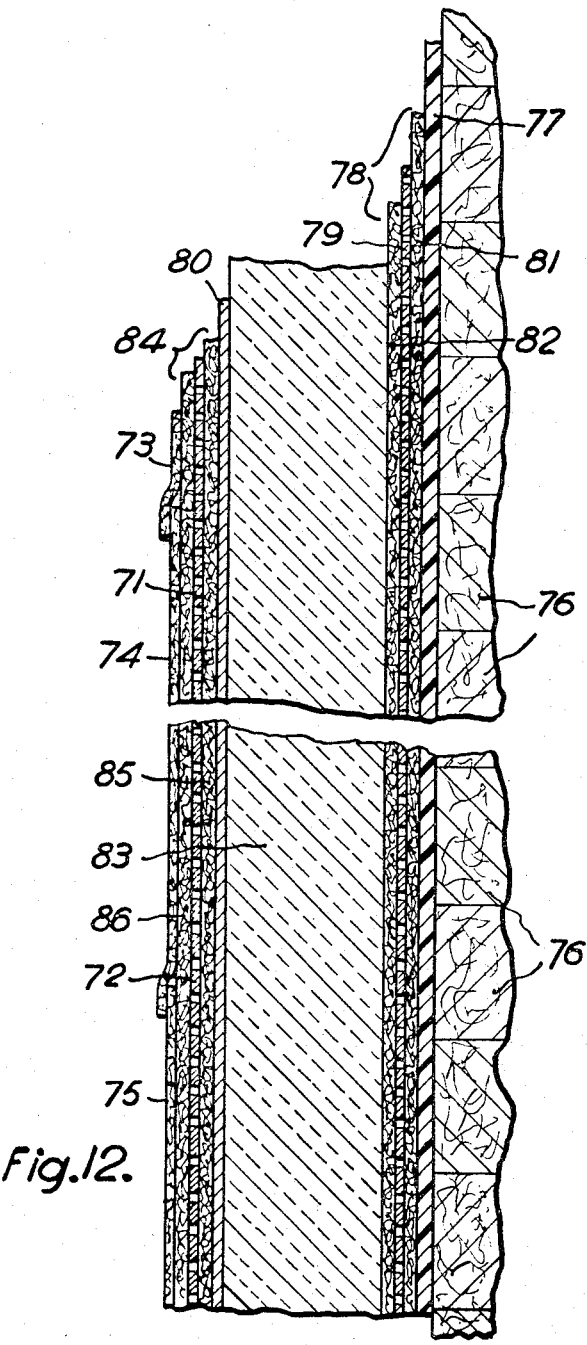

The invention will be further described with reference to the accompanying drawings in which:

FIGURE 1 is a diagrammatic perspective view of one room in a building in which the system of the invention is incorporated, FIGURE 2 is a detail section of one arrangement of thermal insulation of a structural wall of a building in which the system of the invention is incorporated, FIGURE 3 is a front view, and FIGURE 4 is a sectional view, of a device for sensing the wall surface temperature and exerting a corresponding regulation of the energy flow necessary to control the surface temperature, FIGURE 5 is a diagrammatic section illustrating the flow of a heat exchange medium within the mass of a structural wall, FIGURE 6 is a diagrammatic elevation with part of one surface layer cut away, and FIGURE 7 is a cross section on the line VII—VII of FIGURE 6 of a multilayer material which can be applied to a structural wall and within which a regulated flow of a heat exchange medium takes place, FIGURE 8 shows a modification of FIGURE 7, FIGURE 9 is a detail of a device used in conjunction with the material of FIGURES 6 and 7 or 8 to regulate flow of the medium therein, FIGURE 10 is a diagram illustrating one way in which a medium can be circulated to effect desiccation of air entering and control of the surface temperature of the exposed surface of the walls bounding the enclosed space, FIGURE 11 is a diagram illustrating how in a case where a system according to the invention needs to cool the walls of the enclosed space, a cool medium can be drawn from a suitable expanse of natural water such as the sea or a deep lake, FIGURE 12 is a detail section of a multilayer material which is used in some forms of the system according to the invention, and FIGURE 13 is a circuit diagram showing how the two heating films of the material of FIGURE 11 can be independently and differently controlled.

Referring now to FIGURE 1, this shows three walls, the floor and ceiling of a room within a building incorporating the system of the present invention. This room may be regarded as typical and the building may have many rooms all included in the system.

The remote wall 11 is assumed to be an outside wall, i.e. its outer surface is directly exposed to the outdoor atmosphere. A door 12 and a window 13 are shown in this wall. The other two visible walls 14 and 15 are here shown unbroken; they are moreover internal walls and may separate this room from other rooms or from corridors or passages.

As much as possible of the surface of the walls enclosing the room are covered with means whereby the surface temperature can be controlled and maintained at a predetermined temperature below blood heat, as uniformly distributed as possible. It is here assumed that this is done by means of a composite material secured to the walls in adjacent strips 16 examples of which will be described in detail later. Two temperature sensing devices responsive to the surface temperature of the walls at representative areas are indicated at 17; these also will be described in detail later. Finally it is assumed that the room is ventilated solely through openings in the lower part of the window (or louvres) which admit only the minimum amount of air necessary, and immediately outside these openings is a heat exchanger 18 over which the entering air passes and which serves as a desiccator when necessary as will be explained.

As the temperature of the surface of the door 12 cannot readily be controlled, this surface is preferably covered by a curtain (which may embody a heat reflecting layer) shown broken away at 19, to minimise the passage of heat through the door; alternatively or in addition to a curtain the door may be covered internally or externally or both by a heat reflecting layer. At night the window may also be covered with a curtain, while by day a transparent reflecting curtain of glass fabric or a reflector in the form of a venetian blind may be used. The window may also be double glazed to minimise heat transmission through it.

In operation the temperature of the surface of the strips 16 is maintained at a value such that the radiation loss of any adult human occupant of the room amounts to about 400 B.t.u. per hour plus or minus his loss by direct heat exchange with the air. The uniformity of the surface temperature and obstruction of entry or air keep the movement of air to a minimum and thus in itself keeps direct heat exchange with the air at a minimum; this minimum movement will also tend to the air eventually reaching the same temperature as the walls. An added advantage of minimising air flow, especially convective air flow is that dust particles are not held in suspension to become electrically charged by being in an air current near a wall on which they are then deposited.

There are two main possibilities for predetermining the surface temperature automatically regulated by the devices at 17. One is the provision of a device 21 which senses the temperature and humidity of the air and therefore responds to the average rate of direct heat exchange between one occupant and the air, this device serving as a control additional to the regulating action of the device 17, which directly controls the wall surface temperature. Thus the device 21 may automatically control the setting of the device 17, or the two devices 17 and 21 could be combined. The other possibility is simply to provide for manual setting of the devices 17. The latter is usually sufficient because the human organism is reasonably tolerant to variation of the figure of 400 B.t.u. per hour at which the invention aims. In any case a manual setting of the system enables individual preference to be allowed for.

When the occupant first enters the room if the wall is at an unsuitable temperature provision can be made to carry the temperature of the wall surfaces temporarily to a value such that his radiation losses are above or below the standard value so that comfortable conditions can rapidly be obtained. Thus the system may be controlled by a switch which he operates on entry. If the sensing devices at 17 show a marked departure from the required temperature these devices may bring into action a time switch which carries the temperature of the surface in the appropriate direction on to a value outside the normal range, this time switching itself off after a period in the order of a few minutes so that the system thereafter operates in accordance with the standard requirements.

An important element in a practical system according to the invention is the thermal insulation of the walls bounding the space. Thermal insulation of walls is in itself well known but hitherto has been used mainly to reduce heat loss from the building. In the present system the passage of heat in either direction through external walls i.e. walls exposed to the outdoor atmosphere on the opposite side to the enclosed space is important and insulation is used for this purpose. In a building being erected which is to incorporate the present system, insulation for this purpose is desirably also provided between the ends of internal walls (i.e. walls having both surfaces bounding spaces within the building) and external walls where they meet. In addition to this however the layer of insulation in an external wall is on the inside of that wall and incorporates a thermal radiation reflecting surface. Under cold external conditions this retains radiant heat within the space, under hot external conditions it minimises the inward transmission of radiant heat. Further, thermal insulation is also provided in the case of internal walls. The element by which the surface temperature is controlled and maintained may be between the insulation and the exposed surface, or between the insulator and the mass of the wall, or at both locations, or within the mass of the wall depending on circumstances as will be explained.

FIGURE 2 shows one arrangement in the case of an external wall, using an electric resistance heating film, thus being suitable for a system for a cold climate (or use only under cold conditions). Here a wall 22 the outside surface 23 of which is exposed to the outdoor atmosphere, is covered with a layer 24 of thermal insulation, for example a foamed so-called plastic, on this is the heating film 25, then a thin metallic foil 26, and finally a decorative layer 27. It will be understood that the film 25 is in fact usually a composite structure, the external surfaces of which are electrically insulating; such an insulating surface must be present at least between the film and the foil 26. The foil 26 here constitutes a thermal radiation reflecting surface. In suitable cases this foil could itself be of a decorative nature when the layer 27 could be omitted. Again if the film 25 embodies a metallic foil covering practically the whole area this could serve as the reflective layer and the separate foil 26 could be omitted. Another possibility is a white or light coloured paint or like layer as the reflector layer. Further the order of the layers may be changed.

In the case of internal walls there may be a layer of thermal insulation on both sides. The function of the insulation here is not to insulate the enclosed space from the outdoor atmosphere but to control the direction in which heat passes to or from the surface temperature controlling element.

In principle, various known forms of temperature sensing devices indicated at 17 in FIGURE 1 can be used in the system according to the invention. It is important that the actual sensing element should be designed or arranged to sense the wall temperature instead of the air temperature which it does with known thermostats for space heating or cooling by air conditioning. The contact with the wall can be achieved by sticking a flat sensing element on the wall, fixing it so as to keep it pressed against the wall, or burying it altogether in the wall, always shielding it from the air sufficiently to prevent picking up of the air temperature in preference to the wall temperature.

A very convenient construction is shown in FIGURES 3 and 4. This comprises a substantially hemi-spherical container 31, the flat surface of which is mounted flat against the wall surface 32 to be sensed. Any change in temperature of the surface 32 will result in a change of temperature, and therefore of volume, of a liquid 33 of high thermal expansion which fills the container 31. In a recessed portion of the container shell a disc is fitted which incorporates a flexible diaphragm 34 supported by a sealing flange 35, and carrying a metal rod 36 at its center. The rod links the diaphragm to a double acting microswitch 37 housed in the recessed portion of the container and the switch can be adjusted in position to allow it to operate at various positions of the diaphragm. The volume available for the liquid to occupy can be varied by a screw 38 mounted in the center of the spherical shell along a normal to the flat surface, the screw being surrounded by a bellows 40 thus avoiding sealing difficulties. The flat surfaces of the container is closed by a thin metal sheet 39 so designed as to allow a degree of movement either to concave or convex form, if the liquid should continue to contract or expand after the diaphragm has reached one or the other extreme position. In the case of expansion, when the sheet 39 takes an outwardly convex form, the movement forces the container to move slightly against springs such as 41 through which the supporting bolts 42 act. The liquid volume appropriate to the temperature may be marked on an external dial 43 over which a pointer 44 on the center screw 38 works, the operating position of the microswitch 37 being set in accordance.

When the wall surface temperature is to be maintained by the use of a fluid heat exchange medium, it is necessary that the flow should be well distributed over as large an area of the walls as possible and should be regulated so that the surface temperature is as uniform as possible. This calls for slow flow through a porous layer or some equivalent structure, the ducts or passages leading to and from the porous layer and the distribution of porosity being co-ordinated to the required end.

One basic possibility is to provide the porous layer within the mass of the structural walls. Thus as illustrated in FIGURE 5 the cavity in a cavity wall 45 is filled with a porous material 46 having intercommunicating pores, the medium flowing generally vertically. The porosity may vary vertically to regulate the rate of flow at different levels to take account of the fact that the temperature of the medium must vary as it proceeds just because exchange of heat with the wall structure must take place if there is any net heat flow. The porosity can be regulated for example by compressing the material more in some parts than others, by partial impregnation with substances which block the pores and so on. There may be cross and vertical passages to enable various areas to operate in parallel. Such details must usually be settled in designing a particular type of installation.

The porous material may be a foamed plastic, felt, impregnated well-wettable wood cellulose for filling of water cooling towers, metal wool, or porous clay. If it is foamed maerial it may be prefabricated as a sheet, or it may be foamed on site.

In applying the system to an existing building, a material applicable to the surface of a structural wall is more convenient and such may also be used even where the building is to be erected and equipped with the system. Such a material can be applied in strips of convenient width and one form is illustrated in FIGURES 6 and 7.

This is a multilayer material comprising an imprevious layer 46 suitably of polyvinyl chloride or polyester, a porous layer 48 which may be welded or cemented to the layer 47 or be formed on it, and a second impervious layer 49 which may be of the same material as the layer 47, and cemented to the layer 48. It is essential that the pores in the layer 48 should be communicating pores to form narrow passages. This layer may be of foamed polyurethane or polypropylene. Such a material may be formed in the well known way and the pores then be enlarged by known ozone or alkali treatment which also strengthens the walls of the pores.

The multilayer material is provided with longitudinal and transverse passages or channels which are much wider than the passages provided by the communicating pores. These wider passages or channels enable the flow distribution to and from the sections of the porous layer to be regulated. As shown in FIGURES 6 and 7, the longitudinal channels are formed by grooves or depressions 51 in the layer 48 reaching from the surface away from the layer 47 almost to that layer, and the transverse channels are formed by grooves or depressions 52 similarly made in the layer 48. The grooves may be made in the moulding of the layer 48 or after it has been united with the layer 47. The layer 49 bridges over the grooves and completes the formation of the channels.

As shown there are two longitudinal channels 51 adjacent the side edges of the multilayer material and if as will generally be the case, the material is supplied in the roll and pieces are secured to the wall extending vertically, these channels will be vertical. In some cases it may suffice to provide only one longitudinal channel adjacent one edge, while if the material is wide it may be necessary to provide more than two longitudinal channels.

The medium will usually need to be under moderate pressure to ensure the desired flow. Since the various layers of the multilayer material are flexible, provision is made to prevent bulging under this pressure. This provision may be likened to quilting and consists in bonding the layers 47, 49 together as by cementing or welding, through openings in the layer 48. The bonded zones constitute a barrier to flow and by changing their size and position they can be used as an additional means for controlling the flow distribution. To this end the bonded zones may, as shown at 53, be generally transverse to the length of the material, to provide a meandering path for the medium.

Instead of depressing both layers 47, 49 into the openings in the layer 48, as shown in FIGURE 8 the depression may be entirely of one layer, say the layer 49, leaving the other layer 47 flat, the latter preferably being the one which faces the enclosed space so that the quilting would only be visible on the back of the material before it is secured to the wall.

Provision is also made to enable the channels 51, 52 to be at least partially obstructed at various points as a further measure for controlling the flow distribution. The flexibility of the layers 47, 49 enables this readily to be done by depressing the one towards the other at particular points which will usually be at the junctions of the channels 52 with the channels 51, as well as at intervals along the channels. For the sake of appearance, the depressions may be made from the back, i.e. from the surface of the multilayer material nearer the mass of the wall. Adjustable wedges for the purpose may consist, as shown in FIGURE 9, of a spring 54 between two pieces 55 and 56 of adhesive tape. The spring is compressed to give a wedge of the required height, and the two tapes are then secured together. The wedge can then be applied at the required point before the multilayer material is applied to the wall, and the tapes are stuck to the surface of the multilayer material. The tapes are made of sufficient length to hold the wedge in the required position. Such wedges cannot be adjusted once fixed. If subsequent adjustment is required, the wedge may comprise in addition to the spring a solenoid or electromagnet acting in opposition to the spring, in which case by regulating the current through the solenoid or electromagnet the dimensions of the wedge can be varied. Instead of the spring 54 and tape 55 a piece of resilient rubber or the like material may be used.

In the above example described with referenc to FIGURES 6, 7 and 8 the multilayer material is an all plastic laminate, both outer layers and the inner foam being therefore of a material which is usually classed as a thermal insulator; only the medium flowing through the layer 48 makes it into a reasonably good heat conducting and heat transmitting structure. The desired evenness of the heat transfer to the space which in a material wholly of plastics is achieved mainly by regulating the flow to achieve a varying speed of the medium in different parts, can be improved if the multilayer material contains in at least one of its layers a metal foil or metal strands or metal fibres extending in the length direction of the material and being coherent at least over a length sufficient to make the material a substantially better heat conductive multilayer material in its longitudinal direction which is the general direction of the flow of medium in the inner layer 48. Such a metal foil is indicated at 50, FIGURE 8.

It will be understood that as described above with reference to FIGURE 5, a layer of thermal insulation which may incorporate a thermal radiation reflecting layer will be used with the material of FIGURES 6 and 7 and this thermal insulation may be between the multilayer material and the mass of the wall, or between the multilayer material and the enclosed space.

As mentioned above a flowing medium can be used both for raising and lowering the surface temperature of the wall bounding the enclosed space. However, in some cases it may be desirable to provide both flow of a medium and an electric resistance heating film. The film may serve whenever the temperature needs to be raised, for example when the medium is drawn, as described below, from an expanse of water of sufficient depth so that it can only serve for cooling. Or the film may be used solely for the purpose of temporarily raising the temperature above the normal limits, as described above.

As a general rule where a flowing medium is used it will be convenient to let it flow in a closed circuit.

As explained above, when the outdoor atmosphere is at a high temperature and higher humidity than the air in the enclosed space, means are provided, preferably located at the point of entry of air, for desiccating the inflowing air to at least such an extent that its remaining water content will not raise the relative humidity of the air in the enclosed space to a value equal to 100 percent relative humidity at the lowest wall surface temperature of the enclosed space, so as to avoid condensation on the walls of the enclosed space. A great variety of desiccating means are possible. Such devices as filters with silica gel which are continuously regenerated or electro-static filters are feasible in large installations. For smaller residential premises and where trunking of the airflow is to be avoided a preferred choice is a heat exchanger in front of louvres or of a part of the window, as at 18, FIGURE 1. This is a simple practical means for the desired desiccation. Its action on the air inflow is usually to cool it to below the surface temperature of the walls bounding the enclosed space, thus precluding any danger of condensation on the walls because the water content of the cooler air, even if it has 100 percent relative humidity left in it, is less than 100 percent relative humidity at the higher wall temperature. It may be pointed out here that the dependence of the maximum humidity of the air on its temperature means that there is no danger of condensation on the walls under cold external conditions, e.g. in winter when the space conditioning system operates as a space heating system. There is no need to desiccate the inflowing air as the outside air temperature is lower than the wall temperature.

A welcome side effect of the use of a heat exchanger for desiccating the air intake is that the cooling work to be done by the flow of heat exchange energy in or on the walls of the space is so much smaller. A heat exchanger similar to or in the same form as a motor-vehicle radiator framed as a window box and shaded from the sun will make a quite efficient desiccator and at the same time allow the air intake to be restricted by its adjustable shields.

The same heat exchange liquid e.g. the same water, can be used to pass through the heat exchanger used as a desiccator of the air intake and the layers on or in the boundary walls of the enclosed space. Thus, as indicated in FIGURE 10, the water first goes through the heat exchanger 18a (which instead of being at the bottom of the window as in FIGURE 1 could be at the top of the window or at ceiling level on the outside wall), then it enters through a supply pipe 58 running along the top angle of the space, passes through the passages in or on the wall indicated by the panel 16a and leaves the space through a return pipe 59 running along the skirting board. In this example it is pumped through a closed circuit by a pump 61 and kept at the desired temperature level by another fuel operated heat exchanger 62. The term fuel operated is here used in a broad sense to cover local consumption, as when the supply is drawn for example from gas mains, or remote consumption, as when the supply is drawn from electricity mains. The heat exchanger 62 can be a unit which is capable of both warming and cooling the medium. However, when only cooling has to be provided it may advantageously be a liquid to liquid heat exchanger similar to a domestic refrigerator unit. A combined domestic and space conditioning refrigerator can be used, and the medium is pumped from this fuel powered heat exchanger, whilst it is at its lowest temperature, to the exchanger 18a cooling the air intake, thence through the porous layers 16a in or on the walls and back to the heat exchanger 62 where it arrives at its highest temperature. The pump 61 is shown in the return pipe 59 but it can be arranged at any other convenient point in the circuit. The cost of the fuel for the pump 61 and for the heat exchanger 62 are the total running costs. The fuel is usually electricity only, or electricity and gas, for the refrigerator unit and can be readily and accurately controlled by the proposed wall temperature sensing means indicated at 17a. In view of the low volume of air allowed into the space, the minimum temperature differences produced by the system, the heat insulation of the outside wall, and—last but not least—the still air, the fuel costs are very low.

It will be understood that though the heat exchanger 18a is only necessary under certain conditions, if these conditions are likely to arise from time to time and the exchange is provided, it can remain in the circuit at all times. It could be by-passed when not needed, but this complication is usually unnecessary because whenever its temperature is different from the air passing over it into the enclosed space, the air will be cooled or warmed as the case may be and this change in temperature will be in a direction which contributes to the effect aimed at by the invention.

In tropical or subtropical or similar hot localities beside or near an expanse of natural water such as the deep sea or a deep lake where it is possible to sink an open-mouthed insulated pipe 63, FIGURE 1, into such a depth that cold water 64 rising in the tube from that depth has the required low temperature, the fuel for the refrigerator unit of a closed circuit system can be saved altogether and the cold deep water could be pumped by a pump 65 directly to the air inlet desiccating heat exchanger 18b, thence through the porous layers 16b in or on the walls of the enclosed space, being finally drained back into the original source. It may be preferable to provide a thermally insulated central storage tank 66 for the cold water, and for convenience a second pump 67. In such cases if sea water is used the exchanger 18b and the parts should preferably be of material resistant to sea water corrosion. In view of the comparatively low temperature range involved and the ease with which thin walled material of large surface can be provided, a construction entirely of so-called plastics material for the exchanger 18b is preferred.

An alternative both to the refrigerator and the natural water source of cold water is the use of a water cooling tower positioned in an open place and cooling during the cooler period of the day and night, in combination with an insulated storage tank. This and similar schemes are more suitable for larger-scale closed circuits.

Where a flowing medium is used to raise the temperature of the wall surface, since the temperature (except in some cases for short periods when the heat may be supplied by other means as already described) is always below blood temperature, the system can make use of warm water which would be much too cool for any ordinary system of central heating, but which may be available in large quantities from industrial or power generating plant, for example from cooling towers or cooling jackets. Such warm water may be returned to the source after use in the system or be run to waste according to circumstances. Although the surface temperature in the system may be between 55° and 95° F. (145 and 35° C.) the general level is likely to be in the seventies F. (twenties C.). Thus a supply of water at, say, 100° F. would be useful, a temperature which would be completely unusable for most other purposes.

If the water supply in such a case is much hotter and the speed at which it flows through the layers in or on the walls cannot be increased, a thermal insulating layer, such as a porous or cellular plastics material, may be used between the layer through which the water flows and the exposed surface of the wall to obtain the necessary temperature drop.

As has been pointed out earlier, as well as an element in layer form by which heat is dissipated to or from the exposed surface of a large part of the walls enclosing the space, a layer of insulation is an important element in the practical realisation of the system according to the invention. A very suitable insulating material is foamed plastic, e.g. polyurethane or polyproplene, preferably with non-intercommunicating pores and incorporating a thermal radiation reflecting layer such as light colored wallpaper backed with aluminium foil which is less readily dentable than the foamed plastic. Such a layer not only reduces transmission of heat between the enclosed space and the outdoor air, for which purpose a thick layered insulation, from ½ inch up to 2 inches (12.5 to 50 mm.) may be desirable, but may also serve to slow down transmission of heat between the exposed surface and the mass of the wall, or to control ratio of heat flow in opposite directions from and to the heat dissipating layer, for which purpose a thinner layer below ½ inch (12.5 mm.) and often only 1/16 inch or 1/8 inch (1.5 or 3 mm.) thick may suffice. For example, if the heat dissipating layer is between the insulation and the mass of the wall, the latter can serve as a heat storage device, giving the system great thermal inertia. Indeed, if the capacity of the wall, i.e. its mass, is large enough the whole system can be run as a night storage system, which enbles advantage to be taken of the low off-peak tariff which is often available, the heat then continuing to be discharged during the day following a reasonably flat discharge curve. The insulation on the outer surface of the heat dissipating layer allows the mass of the wall to be heated to a higher temperature and therefore enables this system of night storage heating to be used even where the internal walls of a building are not very heavy. The insulation also ensures that the temperature of the surface exposed to the enclosed space never reaches too high a value and also delays the heat exchange between the mass of the wall and the exposed surface, so that the discharge curve is flatter at the exposed surface than it would be for an uninsulated surface or one nearer the interior of the wall.

In the case of an outside cavity wall, the cavity may be filled with thermal insulating material and a reflecting foil, in which case the inner leaf may be used in a similar manner to an inside wall. The insulation may be a cellular plastic foamed on site by an injection process.

Alternatively the heat dissipating layer and a cellular plastic layer may be prefabricated laminates or sheet materials which are laminated when fixed to the inside face of the wall in which case it is possible to cover the wall with a layer of cellular plastic by coating and foaming it in situ. This technique of foaming may be assisted or in some cases made possible at all by the supply of heat which can be created uniformly in the heat dissipating layer which is for and during this operation specially connected to a suitable supply of medium or electricity. A convenient source of supply for the case of a heating film can be a generator on a vehicle the battery of a vehicle or a mains step-down transformer.

The thermal insulation can be between the heat dissipating layer and the mass of the wall, in which case heat dissipation to or from the latter is minimised. This arrangement can also be produced in prefabricated form or by lamination to the wall on the lines above described.

In this case the thermal storage capacity of the mass of the wall may still be used at least in part and the heat exchange is primarily between the layer through which the heat exchange energy flows, viz. the heating film or flowing medium, and the mass of the wall while the heat transmittance of the thermal insulating layer is made the smaller the greater the maximum temperature difference between the surface exposed to the space and the wall is made, i.e. the smaller the mass of the wall and the longer the interval between reversal of heat flow from and to the wall.

Both the possibilities above outlined can be provided by a single multilayer fabric or by two or more fabrics superimposed on site, so that there are two heat dissipating layers with thermal insulation between them, by which layers the surface temperature of at least part of the walls is controlled. There may be additional insulation outside either or both heat dissipating layers. The two heat dissipating layers can be independently controlled and one of them, usually that which lies nearer the enclosed space, may conveniently be used for the above described purpose of temporarily varying the surface temperature of the controlled parts of the boundary walls beyond the normal limits which apply when the system has reached stable conditions, thus avoiding even temporary overloading of the other heat dissipating layer or indeed making such temporary variation possible at all.

By way of example, FIGURE 12 illustrates an arrangement with two heat dissipating layers, both in the form of an electric resistance heating film, though this development of the invention is not restricted to heat dissipating layers of this type; either or both could be constituted by fine passages through which a medium flows, as described above with reference to FIGURE 5 and FIGURES 6, 7 and 8.

Referring now to FIGURE 12, the heating foils 71, 72 and the wallpaper 73, 74, 75 etc. are not mounted directly on wall 76, but are spaced therefrom by further members. Mounted directly on the wall 76 is a relatively thin insulating layer 77. Mounted on this layer is a wall heater 78 comprising a heating foil 79 sandwiched between two layers of insulating paper 81, 82. Mounted on the wall heater 78 is a relatively thick insulating layer 83 on which is mounted a non-dentable layer 80 which protects the layer 83 from being dented. Mounted on the non-dentable layer 80 is the space heater 84 comprising the heating foils 71, 72 etc. sandwiched between insulating paper 85, 86. Finally, the wallpaper 73, 74, 75 etc. is fixed over the space heater 84.

The relatively thick insulating layer 83 is formed of foamed or expanded synthetic resin materials or of corrugated paper, or any such material having a high air/solid ratio and thus forming a good insulator. If the space heater is to be used for preliminarily raising the surface temperature of the wall bounding the enclosed space above the normal limits, the layer 83 is chosen to have a thermal transmittance such that the total heat, e.g. expressed in watts per square foot or per square metre of surface area transmitted through it from the space heater 84, in the initial period of a few minutes, generally less than ten minutes, is very much less than the total energy, also expressed in watts, per square foot or per square metre of surface area supplied to the heating foils 71, 72 etc. during the same period. As the major part of the power supplied to the heating foil of the space heater 84 cannot be transmitted through the insulating layer 83, it must therefore be radiated into the room. Since the heat supplied to the room from foils 71, 72 etc. is by radiation whereas that transmitted through layer 83 from the foil 79 by conduction, appreciably more heat will pass to the room since the amount of heat radiated varies in accordance with the fourth power of the temperature of the foils whereas the amount of heat conducted varies directly with temperature difference across the insulation.

In operation, the wall heater 78 may be supplied with electrical power continuously, controlled to maintain the whole assembly of components shown in FIGURE 11 at a predetermined temperature such that the surface temperature has the value required by the system according to the invention. The heat supplied by heater 78 is "stored" in the wall 76 and also serves to keep the insulating layer 83 and space heater 84 a few degrees above the temperature of the wall 76.

The arrangement can be used for "instantaneous heating" during the preliminary period. When a person enters the room he operates a switch whereby power is supplied to foils 71, 72 etc. of space heater 84 for a period of a few minutes whereby heat is instantly radiated into the room. Layer 83 prevents such heat being conducted to wall 76 immediately, and wall heater 78 also aids in this task. The wall heater 78 acts in this case as a heat barrier or weir, which prevents heat being conducted to wall 76 from the space heater 84 until the temperature gradient across the insulating layer 83 has been raised sufficiently above the temperature of wall heater 78. Until this time substantially all power supplied to space heater 84 will be radiated into the room, and after this time a proportion of the heat will also be conducted to the wall 76. This conducted heat is not wasted, since although it does not warm the room directly, it serves to warm the wall 76 and thus becomes stored therein. In a multi-room system all heat generated within the building is used to maintain the building at a reasonable temperature, and the conducted heat aids in maintaining the shell or wall structure warm.

Another possible way of using the material of FIGURE 12 in the system would be to use the wall heater 78 for heat storage in the mass of the wall 76 during off-peak periods when power can be obtained at a low tariff and to use the space heater 84 to raise the surface temperature as necessary at any time during the period when the off-peak tariff is not available and the wall heater 78 is switched off, i.e. towards the end of the latter period when the wall temperature may have fallen below the value required by the system.

These methods of operation generally require the two heaters 78 and 84 to be connected to the supply through independent controls and for the two heaters to be arranged to dissipate heat into the space under conditions which can be adjusted to differ in respect of at least one of the factors of timing, distribution of energy over the area bounding the enclosed space, amount of energy and manner of dissipation, and possibly also so that the range of adjustment of one of the heat dissipating layers in respect of at least one of the factors which can differ is greater than the range of adjustment of the other heat dissipating layer. For example, if the wall heater 78 is used for storage heating it will usually be switched on for periods which will be substantially longer than the periods for which the space heater 84 will be switched on. Again the rate of supply to the wall heater 78 will usually be constant or vary over a small range while it is switched on, whereas it may be desirable to provide a large range of regulation either of loading of the heater 84 or of the parts of the lattter which are switched on, i.e. the possibility of separately switching different sections of the heater 84.

One simple example of such possibilities is shown in FIGURE 13. Here the one heater comprises two sections 78a, 78b permanently in series through an on and off switch 85 across the low voltage secondary winding of a transformer 86 supplied from conventional alternating current mains, while the other heater comprises two sections 84a, 84b which can be connected in series or parallel across the secondary winding or be switched off altogether, by means of a switch 87. With the switch 87 in the position shown in solid lines, the two sections are connected in series, when it is moved over to the left to the broken line position the two sections are connected in parallel, while in mid-position the two sections are disconnected altogether. In addition to the switches 85, 87 there is a switch 88 which enables the supply to both heaters to be switched off, and a fuse 89 protecting the secondary circuit. It will be understood that the switches 85 and 87 will be controlled in accordance with the conditions, for example the switch 85 from the sensing device 17 of FIGURE 1 and the switch 87 by a combined manual and time mechanism.

The above description of FIGURES 12 and 13 refers to a system suitable only for cold outdor conditions, i.e. one in which raising of the wall surface temperature is always necessary when the system is in action. As above explained however, a material with two heat dissipating layers can have at least one of them constituted by a flowing medium, in which case the system can serve where hot outdoor conditions are to be dealt with, i.e. one in which lowering of the wall surface temperature is sometimes or always necessary. The same conditions apply as regards independent control and flow control can be effected on the same principles as described with regard to the control of electricity supplies.

It will be understood that in general the components not shown of the control means can be of standard type and the actions effected by these controls can be regulations of the water temperature in the case of a flowing medium via control of the refrigerator or heater fuel, regulation of the water pressure or speed via control of the pump, regulation of the passage ways of the water flow in the desiccator and/or porous layers on or in the wall via the valves provided at selected points of the pipes through which the water flows, and regulation of the air intake by moving the shutters in front of the desiccator. Only one or two of these modes of regulation are chosen and acted on singly or together. Generally the supply to the refrigerator or heater and to the pump are switched on and off automatically and the other controls are set manually and fixed in a desired position for a longer period. Corresponding controls would be used in the case of electrical resistance heating film.

What I claim is:

1. A system of thermally conditioning a space enclosed by boundary walls and containing air, while said space is occupied by restricting the heat loss of any occupant through radiation to the boundary walls of the space, while minimizing heat exchange between the occupant and the air in the space, comprising means for warming and directly controlling the temperature of a large part of the surface of the walls which is exposed to and bounds the space, and means for maintaining such part at an average temperature between 55 and 85 degrees F. and thus below blood temperature and is substantially uniformly distributed both in spatial and in time distribution whereby the radiation heat loss of any average adult human occupant of the space to the boundary walls is over a wide solid angle and amounts to about 400 B.t.u. per hour minus the heat exchanged directly between the occupant and the air within the space, and means for keeping the movement of air within the space at such a low value that the direct heat exchange between any such occupant and the air is a small fraction of 400 B.t.u. per hour, and a heat exchanger in front of an opening through which such air as is admitted enters the enclosed space and the heat exchanger serving to desiccate entering air if it is at a higher temperature and humidity than the air in the enclosed space.

2. A system according to claim 1 also comprising a layer of thermal insulation at least on the inside of any of the boundary walls the outside surface of which is exposed to the external atmosphere, and a thermal radiation reflecting surface incorporated in said layer.

3. A system according to claim 1 comprising at least one sensing device which is directly responsive to the surface temperature of a representative area of the exposed wall surface, said sensing device serving to regulate the energy flow necessary to control the surface temperature of the walls.

4. A system according to claim 3 in which the sensing device is thermally insulated from the air temperature in the space.

5. A system according to claim 4 in which a further device senses the temperature and humidity of the air in the enclosed space and serves as a control additional to the regulating action of the device which directly controls the wall surface temperature.

6. A system according to claim 1 also including an electric resistance heating film by which surface temperature of the controlled wall surface bounding the enclosed space is raised at least temporarily when the heat loss to the uncontrolled surface of the walls plus the occupants heat loss to the air in the space exceeds 400 B.t.u. per hour for each adult human occupant of the space.

7. A system according to claim 1 in which the surface temperature of the walls is controlled at least in part by heat exchange between the walls and a flowing medium behind the exposed surface of the walls.

8. A system according to claim 7 in which thermal insulation is included in the heat path from the exposed wall surface which bounds the space to the medium.

9. A system according to claim 8 in which passages for the medium are within the thickness of the mass of the wall, and the insulation is a layer applied to the surface of the mass of the wall towards the enclosed space.

10. A system according to claim 8 in which passages for the medium are within a multi-layer material applied to the inside of the structural walls bounding the space.

11. A system according to claim 10 in which the passages for the flow of the heat exchange medium include narrow passages providing a generally vertical slow flow with wider transfer and connecting passages at intervals.

12. A system according to claim 1 in which the surface temperature of the walls is controlled by heat exchange between the walls and a medium flowing behind the exposed surface of the walls, said medium first flowing through the heat exchanger used for desiccation.

13. A system according to claim 7 in which the medium flows in a closed circuit which includes an external fuel-powered heat exchanger.

14. A cooling system according to claim 7 in which the medium is pumped up from the depths of an expanse of natural water and after flowing through the passages is returned to its source.

15. A system according to claim 1 wherein the walls include two heat dissipating layers with thermal insulation between them, by which layers the surface temperature of at least part of the walls is controlled.

16. A system according to claim 15 in which at least one of the two heat dissipating layers is an electric resistance heating film.

17. A system according to claim 15 in which both heat dissipating layers are electric heating films, one adjacent the surface of the body of the wall, the system also including a further layer of insulation which is on the side of the other heating film which is towards the enclosed space.

18. A system according to claim 15 provided with independent controls for the two heat dissipating layers.

19. A system according to claim 17 in which the two heat dissipating layers are arranged to dissipate heat into the space under conditions which can be adjusted to differ in respect to at least one of the factors of timing, distribution of energy over the area bounding the enclosed space, amount of energy and manner of dissipation.

20. A system according to claim 19 in which the range of adjustment of one of the heat dissipating layers in respect to at least one of the factors which can differ is greater than the range of adjustment of the other heat dissipating layer.

21. A system of thermally conditioning a space enclosed by boundary walls and containing air while said space is occupied by restricting the heat loss of any occupant through radiation to the boundary walls of the space, while minimising heat exchange between the occupant and the air in the space, comprising a multi-layer material applied to a large part of the surface of said walls which is exposed to and bounds said space, said multi-layer material including impermeable facings on both sides and a layer of porous material between said facings, said porous material having narrow passages interconnecting interstices therein and providing for a generally vertical slow flow of a flowing medium, said multi-layer material also including thermal insulation in the heat path from the exposed wall surface which bonds the space to the medium, said large part of said surface being controlled and maintained by heat exchange between said walls and the flowing medium at an average temperature which is between 55° F. and 95° F. and thus below blood temperature and is substantially uniformly distributed spatially and in time whereby the radiation loss of any average adult human occupant of said enclosed space to said boundary walls amounts to about 400 B.t.u. per hour minus the heat lost by any occupant by direct heat exchange with the air within said space, and means for restricting the movement of air within said space at a low value whereby the direct heat exchange between any said occupant and the air is a small fraction of 400 B.t.u. per hour.

22. A system according to claim 21 in which the porous material is a flexible material and the impermeable facings are interconnected strongly and at closely spaced intervals thereby to avoid undue bulging under the pressure of the medium, the interconnections being disposed to avoid interfering with the desired flow distribution of the medium.

23. A system according to claim 22 in which said flexible material also includes wider transfer and connecting passages between said narrow passages and means are provided enabling the wider passages to be at least partially obstructed at various points to enable the flow distribution to be regulated.

24. A system according to claim 21 in which the material in which the passages are provided is in the form of strips, a wide vertical passage being included along at least one side edge of each strip.

25. A system according to claim 24 in which the material in which the passages are provided comprises a first plain impervious sheet, a layer of foamed material hermetically bound to one surface of said first impervious sheet, said foamed material having interconnecting pores, and having at least one longitudinal channel of large cross-section formed by depressions in the foamed material from the surface away from said first impervious sheet, and a second plain impervious sheet sealed to the face of the layer of foamed material away from the first impervious sheet, said second impervious sheet bridging over the depressions and so completing the longitudinal channels.

26. A system according to claim 25 in which cross channels of large cross-section are formed at intervals, joining together at least two longitudinal channels.

27. A system according to claim 26 in which generally transverse openings are provided through the foamed material, through which openings the two impervious sheets are bonded together, thus not only preventing bulging of the structure under the pressure of the medium, but also assisting in controlling the flow distribution of the flowing medium.

References Cited

UNITED STATES PATENTS

| | | | |
|---|---|---|---|
| 1,919,330 | 7/1933 | Hornung | 236—1 |
| 2,012,285 | 8/1935 | Otis | 236—91 X |
| 2,167,878 | 8/1939 | Crawford | 165—48 |
| 2,971,073 | 2/1961 | Eisler | 219—345 X |
| 3,143,637 | 8/1964 | Rifenbergh | 165—49 X |

FOREIGN PATENTS 600,773  6/1960  Canada.

ROBERT A. O'LEARY, *Primary Examiner.*

M. A. ANTONAKAS, *Assistant Examiner.*